United States Patent

[11] 3,580,602

[72] Inventor Gerard E. Hebert
    Livonia, Mich.
[21] Appl. No. 783,340
[22] Filed Dec. 12, 1968
[45] Patented May 25, 1971
[73] Assignee Lockhart Manufacturing Corporation
    Farmington, Mich.

[54] STORAGE RACK
    11 Claims, 10 Drawing Figs.
[52] U.S. Cl. .................................................. 280/79.3,
    211/177
[51] Int. Cl. .................................................. B62b 5/00
[50] Field of Search .......................................... 280/79.2,
    79.3; 211/177, 148

[56] References Cited
    UNITED STATES PATENTS
| | | | |
|---|---|---|---|
| 1,957,656 | 5/1934 | Langenkamp................ | 280/79.3 |
| 1,969,957 | 8/1934 | Zimmerman................. | 280/79.3 |
| 2,279,864 | 4/1942 | Eide............................ | 211/177 |
| 2,385,559 | 9/1945 | Wenthe........................ | 211/177 |
| 3,288,484 | 11/1966 | Brunette...................... | 280/79.2 |

*Primary Examiner*—Benjamin Hersh
*Assistant Examiner*—Robert R. Song
*Attorney*—Barnes, Kisselle, Raisch & Choate ABSTRACT: The storage rack disclosed herein comprises a base, sides and a back which can be manufactured and shipped separately to a bakery or other user and can thereafter be readily assembled without welding to form the storage rack. The base, sides and back have interengaging means thereon which are engageable by a sliding movement.

PATENTED MAY 25 1971 3,580,602
SHEET 1 OF 2
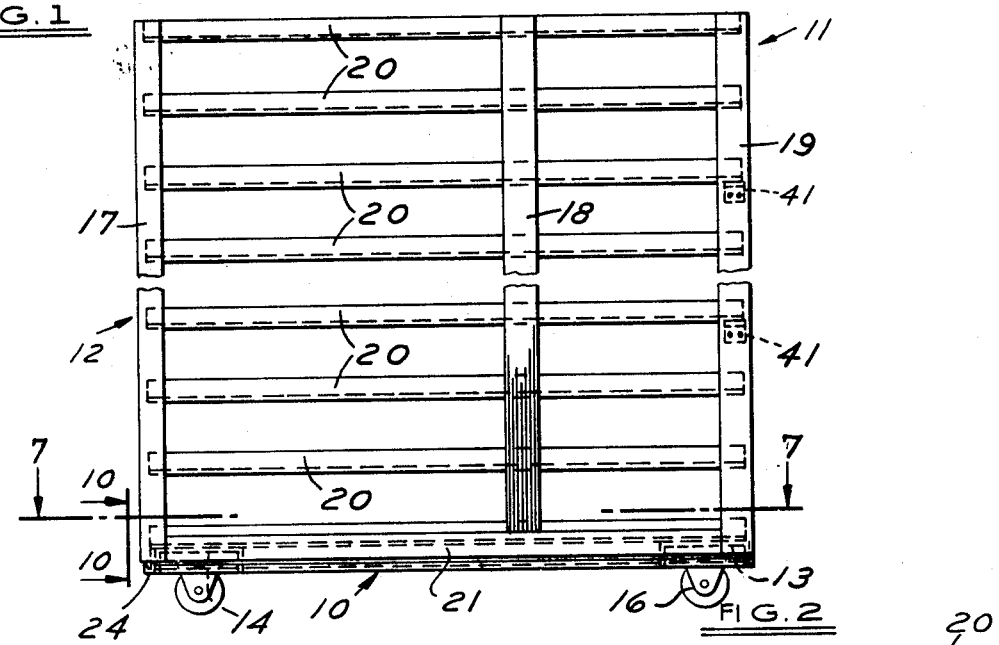
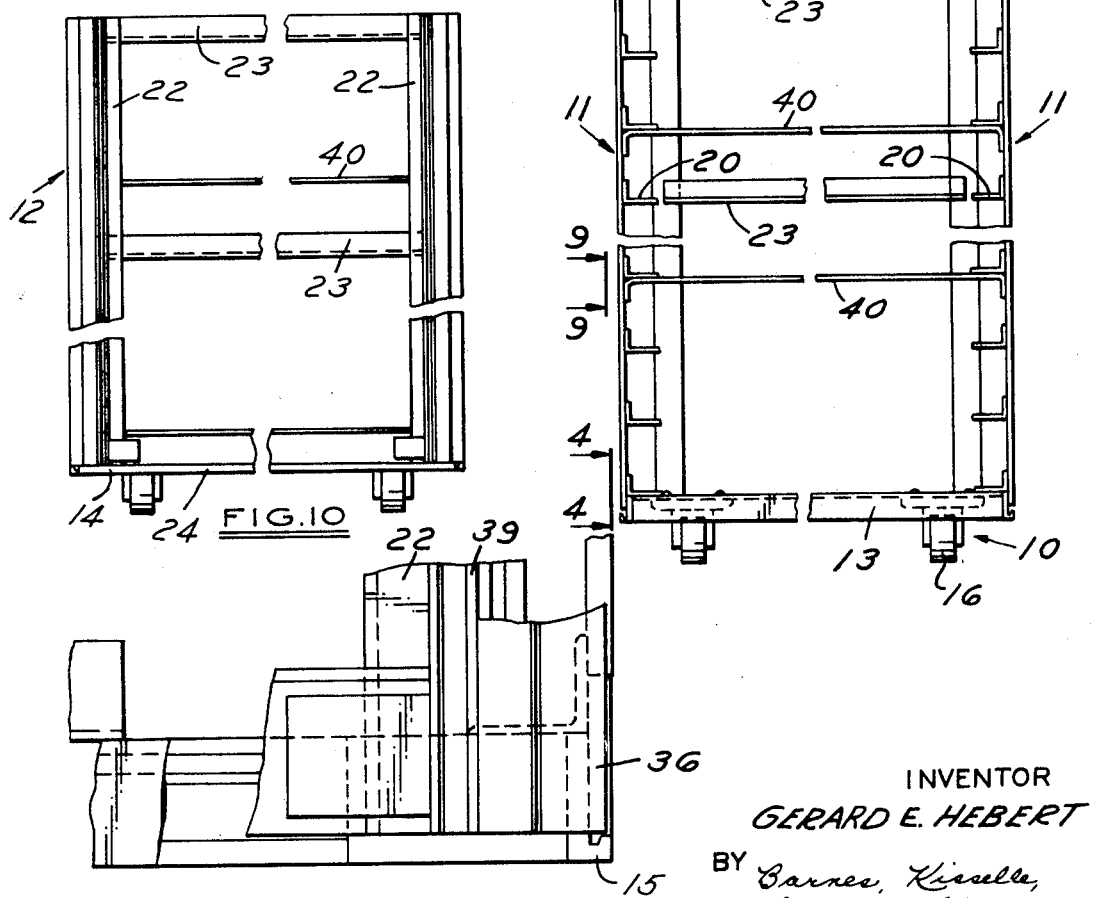
INVENTOR
GERARD E. HEBERT
BY Barnes, Kisselle,
Raisch & Choate
ATTORNEYS

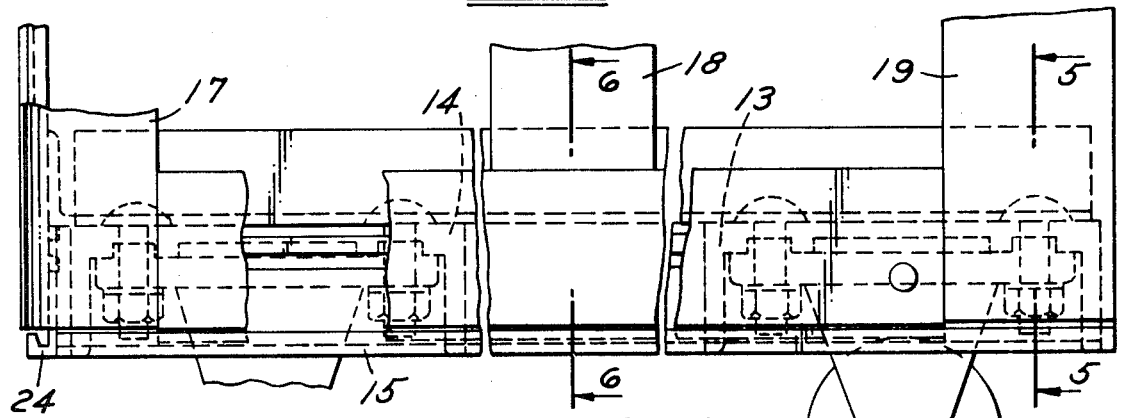
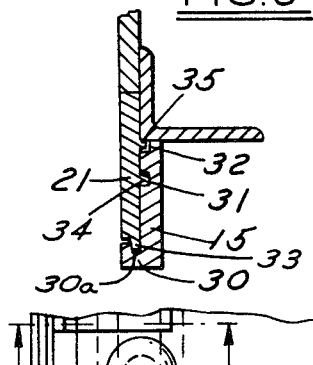
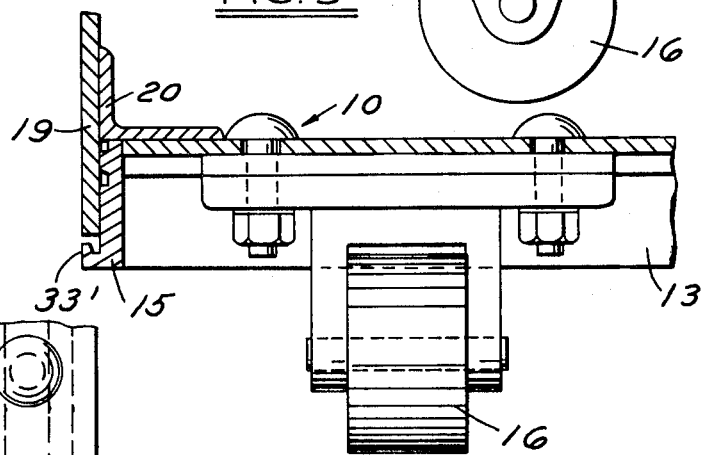
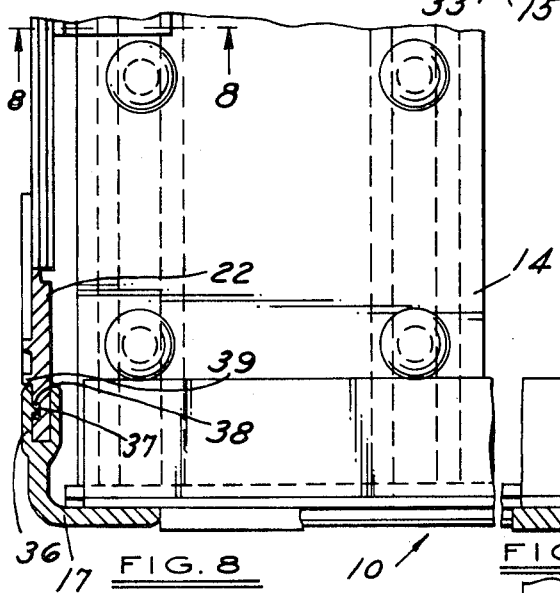
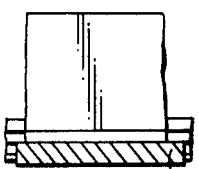
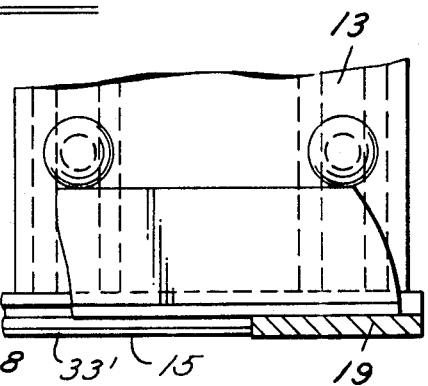
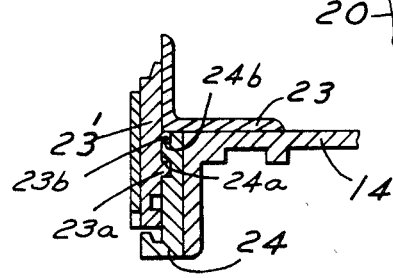

STORAGE RACK

This invention relates to storage racks and particularly to storage racks that are utilized in bakeries and the like to store bread and other goods on trays.

In the handling of bread and other baked goods in a bakery, it is common to store the goods on wheeled racks. The bakeries require substantial quantities of such racks which are usually assembled at the manufacturing plant and shipped in bulk to the bakery. Since the racks are relatively light in weight and occupy large volumes, premiums must be paid as to the freight rates because of the large volume. Moreover when the racks arrive at the bakery they occupy large spaces until needed and cannot be readily disassembled when not needed.

Among the objects of the invention are to provide a storage rack for bakeries and the like which can be shipped in unassembled condition thereby resulting in substantial freight savings for the customer; which can be readily assembled by unskilled persons; which can be readily assembled, in proper relationship without error and disassembled and without the use of other than handtools; which are strong; and which utilize a minimum of material.

In the drawings: FIG. 1 is a side elevational view of a storage rack embodying the invention.

FIG. 2 is a fragmentary front elevational view of the storage rack.

FIG. 3 is a rear elevational view of the storage rack.

FIG. 4 is a fragmentary view on an enlarged scale taken along the line 4—4 in FIG. 2.

FIG. 5 is a fragmentary sectional view taken along the line 5—5 in FIG. 4.

FIG. 6 is a fragmentary sectional view taken along the line 6—6 in FIG. 4.

FIG. 7 is a fragmentary sectional view on an enlarged scale taken along the line 7—7 in FIG. 1.

FIG. 8 is a fragmentary sectional view taken along the line 8—8 in FIG. 7.

FIG. 9 is a fragmentary view on an enlarged scale taken along the line 9—9 in FIG. 2.

FIG. 10 is a fragmentary view taken along the line 10—10 in FIG. 1.

Referring to FIGS. 1—5, the storage rack embodying the invention is made of aluminum or similar lightweight material and comprises a base 10, a pair of sides 11 and a back 12. The base 10 comprises front and rear inverted transversely extending channel members 13, 14 which are interconnected by longitudinally extending members 15 having identical cross sections (FIG. 9) which are preferably extruded to a particular shape as hereinafter described. Wheel assemblies 16 are provided at the ends of each of the channel members 13, 14.

As shown in FIGS. 1 and 4, each side 11 comprises vertical members 17, 18 and 19 and horizontally extending angle members 20 welded in vertically spaced relation between the vertical members 17, 18 and 19 and cooperate as shown in FIG. 2 with the oppositely disposed members 20 to form shelves for receiving trays and the like to support the trays within the rack. A longitudinally extending member 21 in the form of an extrusion as presently described is welded between the lower ends of the uprights 17, 18 and 19.

As shown in fig. 3, the back 12 comprises spaced vertical members 22 which are in the form of extrusions and vertically spaced transverse members 23 welded to members 22. Each member 23 is in the form of an angle to form a rear support cooperating with the channels 20 to form the shelves. As shown in FIG. 8, the base 10 further includes a transversely extending extrusion member 24 along the rear edge of the rearmost member 14.

In practice each of the base, sides and back are formed at the place of manufacture and shipped to the user. Since these parts are generally flat, they can be stacked for shipment and thereby avoid freight penalties which are a result of shipping goods that have large volumes but low weight.

Upon arrival at the user such as the baker, the parts can be stored until it is desired to use them. When the storage rack is to be assembled, the base, sides and back are assembled by a longitudinal sliding movement without the use of tools, welding or the like as presently described.

Referring to FIG. 6, the longitudinally extending side members 15 on the sides of the base are in the form of extrusions and have a lower L-shaped portion 30 and vertically spaced horizontal grooves 31, 32. The member 21 on the lower side edges of each side 11 has a complementary cross section including a projection 33 engaging the groove 30a in portion 30 and ribs 34, 35 engaging grooves 31, 32. Each sidewall 11 is interengaged with the base 10 by a relative sliding movement causing the members 15, 21 to become engaged.

Referring to FIG. 8, each vertical longitudinally extending member 17 of each sidewall 11 is generally in the shape of a right angle and has a longitudinally extending U-shaped portion 36 with an inwardly extending groove one wall of which has longitudinal ribs 37, 39 thereon. The vertical members 22 on the back 12 are of substantially identical construction to the members 21 with the addition of a complementary groove 38 that engages rib 37. A rib 39 on member 22 engages the edge of portion 36. The back 12 is thus assembled between the sides 11 by a relative sliding movement causing the members 22 on the back 12 to engage the members on the sides 17.

As shown in FIG. 8, the lowermost member 23 of the back 12 is of substantially identical cross section as member 22 (FIG. 7) and has a rib 23a and rib 23b and the rear member 24 is of substantially identical cross section as the member 15 (FIG. 6) and has grooves 24a, 24b in order to minimize the number of parts of different designs which may be needed. In assembling the rack, the base 10 is not pushed rearwardly until the back 12 has been moved downwardly into position so that further rearward movement of the back will cause engagement between the ribs 23a, 23b on the member 23' of the back with the grooves 24a, 24b of the member 24 on the base.

After the base, sides and back are thus assembled by a relative longitudinal or sliding movement, additional vertically spaced members 40 are preferably connected between the members 19 of the sides as by screws 41 to provide rigidity for the front portion of the rack.

It can thus be seen that there has been provided a rack that can be manufactured in separate parts that are readily shipped without freight penalty, can be readily stored at the place of the user, and can be readily assembled with no tools or the most a screwdriver or other similar handtool. After assembly the storage rack can be disassembled readily at any time for storage or shipment.

I claim:

1. In a storage rack or the like, the combination comprising a base having side edges and a rear edge,
a pair of sides having bottom edges,
the side edges of said base and the bottom edges of said side having longitudinally extending interengaging members which are engaged by a longitudinal sliding movement of the sides and base relative to one another,
a back having side edges and a lower edge,
the side edges of said back and the rear edges of said sides having longitudinally extending interengaging portions that are engaged by relative longitudinal movement of the back and sides,
said base having a transversely extending portion adjacent its rear edge for receiving the lower edge of said back,
said transversely extending portion of said base and the lower edge of said back having interengaging complementary ribs and grooves.

2. The combination set forth in claim 1 wherein said interengaging means between said base and said back and said sides comprises complementary ribs and grooves.

3. The combination set forth in claim 1 including wheels mounted on said base.

4. The combination set forth in claim 1 including vertically spaced members extending horizontally on each of said sides in the oppositely disposed faces thereof for receiving trays and the like.

5. The combination set forth in claim 1 including vertically spaced reinforcing members extending between the front edges of said sides.

6. In a storage rack or the like, the combination comprising
a base having side edges and a rear edge,
a pair of sides having bottom edges,
the side edges of said base and the lower edges of said sides having longitudinally extending members thereon,
said members having complementary interengaging means thereon which are engageable by longitudinal sliding movement of said sides relative to said base,
a back having side edges and a lower edge,
said back and said rear edges of said sides having longitudinally extending members thereon,
said members having interengaging means thereon engageable by longitudinal sliding movement,
a transversely extending portion of said base and the lower edge of said back having interengaging complementary ribs and grooves.

7. The combination set forth in claim 6 wherein said base comprises spaced front and rear transverse members connected by said side longitudinal members.

8. The combination set forth in claim 6 wherein said longitudinally extending members on said side edges of said back and said bottom edges of said sides have substantially identical cross sections.

9. The combination set forth in claim 6 including vertically spaced horizontally extending members on the inner surfaces of each said side defining shelves for receiving trays and the like.

10. The combination set forth in claim 9 including wheels on said transverse members.

11. The combination set forth in claim 9 wherein said longitudinally extending side members on said base and said transverse member on said base have substantially identical cross section.